3,008,841
GLASS COMPOSITION
Ralph L. Tiede, Newark, Ohio, assignor to Owens-Corning Fiberglas Corporation, a corporation of Delaware
No Drawing. Filed June 19, 1959, Ser. No. 821,385
11 Claims. (Cl. 106—54)

This invention relates to glass compositions and more specifically to compositions suitable for fiberizing and combination with a resin in glass-resin products.

Acrylic resins have been progressively improved over the past years and are being considered as materials for combination with glass reinforcements in a variety of new products. The acrylic resins when combined with conventional textile glass fibers results in an undesirable appearance. The poor appearance is apparently due to differences in the indices of refraction of the resin and the glass. Certain acrylic resins have an index of refraction of 1.49 and glass fibers having the composition of U.S. Patent 2,334,961, commonly known as textile fibers, have an index sufficiently different than that of the resin so that when the resin and fibers are combined an unpleasant opal or hazy appearance results in the product. Although conventional textile glass fibers provide reinforcement, the appearance becomes critical in certain products, and the need arises for a composition having an index of refraction such that the glass reinforcement is invisible in the resin-glass product or provides a pleasing appearance if somewhat visible in the resin.

It is an object of this invention to provide a glass composition suitable for incorporation into an acrylic resin.

It is an object to provide a glass suitable for use as a reinforcement in synthetic resinous materials.

It is a further object to provide glass compositions capable of being fiberized and exhibiting good durability after being fiberized.

It has been discovered that silica and boric oxide lower the refractive index and that soda and certain other ingredients such as fluorides, alumina, lime and magnesia must be added to provide the proper viscosity-temperature relationship, durability and miscibility to the resultant composition.

The components are present in the following proportions expressed in weight percent.

| Ingredient: | Percent |
|---|---|
| $SiO_2$ | 55–80. |
| $Al_2O_3$ | 3–12. |
| CaO | 0–8, preferably 2–8. |
| MgO | 0–5, preferably 1–5. |
| $B_2O_3$ | 11–14. |
| $Na_2O$ | 2–12. |
| $F_2$ | Up to 4. |
| $Fe_2O_3$ | Not more than 0.4. |

The following compositions are illustrative of compositions suitable for the uses outlined.

Example 1

| Ingredient: | Percent by weight |
|---|---|
| $SiO_2$ | 59.96 |
| $Al_2O_3$ | 8.00 |
| CaO | 4.17 |
| MgO | 2.84 |
| $B_2O_3$ | 13.99 |
| $Na_2O$ | 9.00 |
| $F_2$ | 2.00 |
| $Fe_2O_3$ | 0.04 |
| | 100.00 |

Refractive index of fibers 1.50

| Log viscosity: | Temp., ° F. |
|---|---|
| 2.00 | 2700 |
| 2.25 | 2550 |
| 2.50 | 2415 |
| 2.75 | 2297 |
| 3.00 | 2190 |

Example 2

| Ingredient: | Percent by weight |
|---|---|
| $SiO_2$ | 61.40 |
| $Al_2O_3$ | 7.92 |
| CaO | 3.50 |
| MgO | 2.38 |
| $B_2O_3$ | 13.87 |
| $Na_2O$ | 7.92 |
| $F_2$ | 2.97 |
| $Fe_2O_3$ | 0.04 |
| | 100.00 |

Refractive index of fibers 1.49   Liquidus <2000° F.

| Log viscosity: | Temp., ° F. |
|---|---|
| 2.00 | 2795 |
| 2.25 | 2635 |
| 2.50 | 2497 |
| 2.75 | 2370 |
| 3.00 | 2255 |

Example 3

| Ingredient: | Percent by weight |
|---|---|
| $SiO_2$ | 69.91 |
| $Al_2O_3$ | 4.00 |
| CaO | 5.99 |
| MgO | 4.07 |
| $B_2O_3$ | 11.99 |
| $Na_2O$ | 4.00 |
| $Fe_2O_3$ | 0.04 |
| | 100.00 |

Refractive index 1.49   Liquidus >2090° F.

| Log viscosity: | Temp., ° F. |
|---|---|
| 2.50 | 2760 |
| 2.75 | 2635 |
| 3.00 | 2545 |
| 3.25 | 2410 |

Example 4

| Ingredient: | Percent by weight |
|---|---|
| $SiO_2$ | 67.87 |
| $Al_2O_3$ | 3.88 |
| CaO | 5.82 |
| MgO | 3.96 |
| $B_2O_3$ | 11.64 |
| $Na_2O$ | 3.88 |
| $F_2$ | 2.91 |
| $Fe_2O_3$ | 0.04 |
| | 100.00 |

Refractive index 1.50

Example 5

| Ingredient: | Percent by weight |
|---|---|
| $SiO_2$ | 76.16 |
| $Al_2O_3$ | 3.81 |
| $B_2O_3$ | 11.42 |
| $Na_2O$ | 8.57 |
| $Fe_2O_3$ | 0.04 |
| | 100.00 |

Refractive index 1.49

Example 6

| Ingredient: | Percent by weight |
|---|---|
| $SiO_2$ | 65.91 |
| $Al_2O_3$ | 7.99 |
| CaO | 5.99 |
| MgO | 4.08 |
| $B_2O_3$ | 11.99 |
| $Na_2O$ | 4.00 |
| $Fe_2O_3$ | 0.04 |
| | 100.00 |

Refractive index 1.50

| Log viscosity: | Temp., °F. |
|---|---|
| 2.75 | 2685 |
| 3.00 | 2565 |
| 3.25 | 2450 |

Example 7

| Ingredient: | Percent by weight |
|---|---|
| $SiO_2$ | 61.92 |
| $Al_2O_3$ | 7.99 |
| CaO | 5.99 |
| MgO | 4.08 |
| $B_2O_3$ | 11.99 |
| $Na_2O$ | 7.99 |
| $Fe_2O_3$ | 0.04 |
| | 100.00 |

Refractive index 1.50

| Log viscosity: | Temp., °F. |
|---|---|
| 2.25 | 2670 |
| 2.50 | 2535 |
| 2.75 | 2415 |

Example 8

| Ingredient: | Percent by weight |
|---|---|
| $SiO_2$ | 65.95 |
| $Al_2O_3$ | 8.00 |
| CaO | 3.58 |
| MgO | 2.44 |
| $B_2O_3$ | 13.99 |
| $Na_2O$ | 6.00 |
| $Fe_2O_3$ | 0.04 |
| | 100.00 |

Refractive index 1.49    Liquidus 1908° F.

| Log viscosity: | Temp., °F. |
|---|---|
| 2.50 | 2750 |
| 2.75 | 2615 |
| 3.00 | 2490 |
| 3.25 | 2380 |

Example 9

| Ingredient: | Percent by weight |
|---|---|
| $SiO_2$ | 65.97 |
| $Al_2O_3$ | 8.00 |
| CaO | 4.18 |
| MgO | 2.82 |
| $B_2O_3$ | 15.99 |
| $Na_2O$ | 3.00 |
| $Fe_2O_3$ | 0.04 |
| | 100.00 |

Refractive index 1.49    Liquidus 1964° F.

Example 10

| Ingredient: | Percent by weight |
|---|---|
| $SiO_2$ | 65.97 |
| $Al_2O_3$ | 8.00 |
| CaO | 5.98 |
| MgO | 4.02 |
| $B_2O_3$ | 13.99 |
| $Na_2O$ | 2.00 |
| $Fe_2O_3$ | 0.04 |
| | 100.00 |

Refractive index 1.50

Example 11

| Ingredient: | Percent by weight |
|---|---|
| $SiO_2$ | 65.96 |
| $Al_2O_3$ | 8.00 |
| CaO | 7.17 |
| MgO | 4.83 |
| $B_2O_3$ | 11.00 |
| $Na_2O$ | 3.00 |
| $Fe_2O_3$ | 0.04 |
| | 100.00 |

Refractive index 1.51

Example 12

| Ingredient: | Percent by weight |
|---|---|
| $SiO_2$ | 65.96 |
| $Al_2O_3$ | 8.00 |
| CaO | 5.98 |
| MgO | 4.02 |
| $B_2O_3$ | 10.00 |
| $Na_2O$ | 6.00 |
| $Fe_2O_3$ | 0.04 |
| | 100.00 |

Refractive index 1.50

Example 13

| Ingredient: | Percent by weight |
|---|---|
| $SiO_2$ | 65.96 |
| $Al_2O_3$ | 4.00 |
| CaO | 4.76 |
| MgO | 3.24 |
| $B_2O_3$ | 12.00 |
| $Na_2O$ | 8.00 |
| $F_2$ | 2.00 |
| $Fe_2O_3$ | 0.04 |
| | 100.00 |

Refractive index 1.50

Example 14

| Ingredient: | Percent by weight |
|---|---|
| $SiO_2$ | 65.97 |
| $Al_2O_3$ | 8.00 |
| CaO | 2.38 |
| MgO | 1.62 |
| $B_2O_3$ | 11.00 |
| $Na_2O$ | 11.00 |
| $Fe_2O_3$ | 0.03 |
| | 100.00 |

Refractive index 1.50    Liquidus 1980° F.

| Log viscosity: | Temp., °F. |
|---|---|
| 2.25 | 2790 |
| 2.50 | 2640 |
| 2.75 | 2505 |
| 3.00 | 2385 |

Example 15

| Ingredient: | Percent by weight |
|---|---|
| $SiO_2$ | 57.98 |
| $Al_2O_3$ | 11.99 |
| CaO | 5.95 |
| MgO | 4.05 |
| $B_2O_3$ | 11.99 |
| $Na_2O$ | 8.00 |
| $Fe_2O_3$ | 0.04 |
| | 100.00 |

Refractive index 1.51

| Log viscosity: | Temp., °F. |
|---|---|
| 2.00 | 2780 |
| 2.25 | 2645 |
| 2.50 | 2515 |
| 2.75 | 2405 |
| 3.00 | 2300 |

Example 16

| Ingredient: | Percent by weight |
|---|---|
| $SiO_2$ | 61.97 |
| $Al_2O_3$ | 8.00 |
| $CaO$ | 3.57 |
| $MgO$ | 2.43 |
| $B_2O_3$ | 13.99 |
| $Na_2O$ | 8.00 |
| $F_2$ | 2.00 |
| $Fe_2O_3$ | 0.04 |
| | 100.00 |

Refractive index 1.50

| Log viscosity: | Temp., °F. |
|---|---|
| 2.00 | 2880 |
| 2.25 | 2717 |
| 2.50 | 2570 |
| 2.75 | 2445 |
| 3.00 | 2330 |

Example 17

| Ingredient: | Percent by weight |
|---|---|
| $SiO_2$ | 61.09 |
| $Al_2O_3$ | 7.88 |
| $CaO$ | 3.48 |
| $MgO$ | 2.37 |
| $B_2O_3$ | 13.32 |
| $Na_2O$ | 7.88 |
| $F_2$ | 3.94 |
| $Fe_2O_3$ | 0.04 |
| | 100.00 |

Refractive index 1.49

| Log viscosity: | Temp., °F. |
|---|---|
| 2.25 | 2775 |
| 2.50 | 2630 |
| 2.75 | 2495 |
| 3.00 | 2368 |

Example 18

| Ingredient: | Percent by weight |
|---|---|
| $SiO_2$ | 62.25 |
| $Al_2O_3$ | 6.03 |
| $CaO$ | 2.41 |
| $MgO$ | 1.64 |
| $B_2O_3$ | 13.58 |
| $Na_2O$ | 12.05 |
| $F_2$ | 2.01 |
| $Fe_2O_3$ | 0.03 |
| | 100.00 |

Refractive index 1.50

| Log viscosity: | Temp., °F. |
|---|---|
| 2.00 | 2825 |
| 2.25 | 2675 |
| 2.50 | 2530 |
| 2.75 | 2395 |
| 3.00 | 2275 |

Example 19

| Ingredient: | Percent by weight |
|---|---|
| $SiO_2$ | 61.96 |
| $Al_2O_3$ | 6.00 |
| $CaO$ | 2.40 |
| $MgO$ | 1.63 |
| $B_2O_3$ | 13.99 |
| $Na_2O$ | 11.99 |
| $F_2$ | 2.00 |
| $Fe_2O_3$ | 0.03 |
| | 100.00 |

Refractive index 1.50

| Log viscosity: | Temp., °F. |
|---|---|
| 1.50 | 2850 |
| 1.75 | 2685 |
| 2.00 | 2520 |
| 2.25 | 2375 |
| 2.50 | 2245 |
| 2.75 | 2135 |
| 3.00 | 2030 |

Example 20

| Ingredient: | Percent by weight |
|---|---|
| $SiO_2$ | 61.10 |
| $Al_2O_3$ | 7.88 |
| $CaO$ | 3.48 |
| $MgO$ | 2.37 |
| $B_2O_3$ | 13.80 |
| $Na_2O$ | 7.88 |
| $F_2$ | 3.45 |
| $Fe_2O_3$ | 0.04 |
| | 100.00 |

Refractive index 1.49

Example 21

| Ingredient: | Percent by weight |
|---|---|
| $SiO_2$ | 60.69 |
| $Al_2O_3$ | 7.96 |
| $CaO$ | 3.84 |
| $MgO$ | 2.61 |
| $B_2O_3$ | 13.91 |
| $Na_2O$ | 8.46 |
| $F_2$ | 2.49 |
| $Fe_2O_3$ | 0.04 |
| | 100.00 |

Refractive index of fibers 1.495

As can be seen from the examples, silica and boric oxide are essential ingredients. These two materials are effective in producing low refractive index glasses. Practical glass compositions having a refractive index of about 1.49 to 1.51 will have a rather large proportion of both of these ingredients. Silica and boric oxide tend to be immiscible but an addition of alumina corrects this condition. Calcia and alumina when added reduce the viscosity and improve the durability of the glass. Iron oxide is preferably 0.04% or lower for appearance sake but the percentage can go as high as 0.4. High values may aid forming characteristics and allow lower batch costs.

The glass compositions disclosed have refractive indices of 1.45, 1.50 or 1.51 and they are fiberizable by conventional methods. Conventional fiber forming processes comprise flowing a stream of molten glass from a supply and attenuating the stream or streams into fibers utilizing a blast of gas or a mechanical pulling device as the attenuating means. Steam blowers (Kleist et al. Patent 2,287,006) or gas-air burners (Stalego Patent 2,481,543) are used to provide a blast in some of the processes well known in the art. Collet winders (Beach Patent 2,391,870) and pulling wheels (Slayter et al. Patent 2,729,027) are used as devices for mechanically attenuating fibers.

The viscosity-temperature relationship is an important physical property with respect to fiber forming. The relationship between temperature and viscosity in the pertinent range is commonly determined by the rotating cylinder method. The glass is held in a suitable container in a furnace in which it can be heated to the desired temperature. The torque required to rotate a spindle immersed in the molten glass at a constant speed is measured and may be converted to viscosity, usually expressed in poises. The relationship between viscosity and temperature may be determined by making measurements at several different temperatures. It is often convenient to plot this data in the form of a curve of the logarithm of viscosity versus temperature. After determining the liquidus of the glass, the viscosity at the liquidus can be determined from such a curve. The greater the viscosity at the liquidus, the less likely it will be that devitrification will interfere with fiber formation in the fiber forming operation. Although the liquidus temperatures are given in only Examples 2, 3, 8, 9 and 14, these Examples indicate the desirable liquidus-viscosity relationship for fiber forming.

The glass compositions disclosed are especially suited for making textile fibers in strand form that are chopped into short lengths and collected in the form of a mat. This mat is utilized as a reinforcement for any resin and especially for an acrylic resin having substantially the same refractive index as that of the glass, i.e., 1.49 or 1.50. It is of course desirable to have complete wet-out of the fibers by the resin being reinforced and to have a size composition having the proper refractive index and coupling properties upon the fibers prior to combination of the glass and resin but the present invention is directed to proper glass compositions as claimed.

Fluorine, when added to the glass compositions, lowers the viscosity. A suitable source of fluorine is sodium silicofluoride; the percentages indicated are theoretical amounts based upon starting compositions. Crucible melting results in a loss of one-third of the indicated fluorine content. If fluorine is used, it can be added in as large proportions as possible without resulting in opal glass. Even through marbles produced from these batches may be slightly opal, fibers produced from the marbles will not be opal since thye chill rapidly as they are being formed.

Modifications and variations within the scope of the appended claims are included.

I claim:
1. Glass composition comprising 59.96% silica, 8.00% alumina, 4.17% calcia, 2.84% magnesia, 13.99% boric oxide, 9.00% sodium oxide, 2.00% fluorine, and 0.04% iron oxide, all percentages being by weight.
2. Glass composition comprising 61.40% silica, 7.92% alumina, 3.50% calcia, 2.38% magnesia, 13.87% boric oxide, 7.92% sodium oxide, 2.9% fluorine, and 0.04% iron oxide, all percentages being by weight.
3. Glass composition comprising 65.97% silica, 8.00% alumina, 5.98% calcia, 4.02% magnesia, 13.99% boric oxide, 2.00% sodium oxide, and 0.04% iron oxide, all percentages being by weight.
4. Glass composition comprising 61.97% silica, 8.00% alumina, 3.57% calcia, 2.43% magnesia, 13.99% boric oxide, 8.00% sodium oxide, 2.00% fluorine, and 0.04% iron oxide, all percentages being by weight.
5. Glass composition comprising 61.09% silica, 7.88% alumina, 3.48% calcia, 2.37% magnesia, 13.32% boric oxide, 7.88% sodium oxide, 3.94% fluorine, and 0.04% iron oxide, all percentages being by weight.
6. Glass composition comprising 61.96% silica, 6.00% alumina, 2.40% calcia, 1.63% magnesia, 13.99% boric oxide, 11.99% sodium oxide, 2.00% fluorine, and 0.03% iron oxide, all percentages being by weight.
7. Glass composition comprising 61.10% silica, 7.88% alumina, 3.48% calcia, 2.37% magnesia, 13.80% boric oxide, 7.88% sodium oxide, 3.4% fluorine, and 0.04% iron oxide, all percentages being by weight.
8. Glass composition comprising 60.69% silica, 7.96% alumina, 3.84% calcia, 2.61% magnesia, 13.91% boric oxide, 8.46% sodium oxide, 2.49% fluorine, and 0.04% iron oxide, all percentages being by weight.
9. Glass fibers comprising the glass composition of claim 2, the index of refraction of the fibers being 1.49.
10. Glass fibers of the composition of claim 8, the refractive index of the fibers being 1.495.
11. Glass composition consisting essentially of from 59.96–61.97% silica, from 6.00–8.00% alumina, from 2.40–4.17% calcia, from 1.63–2.84% magnesia, from 13.32–13.99% boric oxide, from 7.88–11.99% sodium oxide, and up to 3.94% fluorine, all percentages being on a weight basis, said composition having an index of refraction of from 1.49–1.51.

References Cited in the file of this patent

UNITED STATES PATENTS

| | | |
|---|---|---|
| 2,582,852 | Shoemaker | Jan. 15, 1952 |
| 2,877,124 | Welsch | Mar. 10, 1959 |
| 2,883,296 | Labino | Apr. 21, 1959 |

OTHER REFERENCES

Glastechnische Tabellen (Germany), pp. 688 and 690, by Eitel et al. (1932).